United States Patent [19]
Hiemstra

[11] Patent Number: 5,431,473
[45] Date of Patent: Jul. 11, 1995

[54] MIRROR COVER AND VISOR EXTENDER

[75] Inventor: David L. Hiemstra, Byron Center, Mich.

[73] Assignee: Prince Corporation, Holland, Mich.

[21] Appl. No.: 224,822

[22] Filed: Apr. 8, 1994

[51] Int. Cl.⁶ ............................................. B60J 3/02
[52] U.S. Cl. ................................ 296/97.8; 296/97.2; 296/97.5
[58] Field of Search ............ 296/97.1, 97.2, 97.5, 296/97.6, 97.8

[56] References Cited

U.S. PATENT DOCUMENTS

| D. 281,413 | 11/1985 | Prince Corporation et al. | D12/191 |
|---|---|---|---|
| D. 335,482 | 5/1993 | Warsaw | D12/191 |
| 1,495,517 | 5/1924 | Hogan | 296/97.12 X |
| 2,201,197 | 1/1938 | Minor, Jr. | |
| 2,276,585 | 3/1942 | Mandel | 296/97.5 |
| 2,667,222 | 10/1952 | McCarthy et al. | |
| 4,783,111 | 11/1988 | Hemmeke et al. | 296/97.8 |
| 4,791,537 | 12/1988 | Fisher et al. | 362/135 |
| 4,988,140 | 1/1991 | Van Order | 296/97.2 |

FOREIGN PATENT DOCUMENTS 9113778 9/1991 WIPO ................ 296/97.8

Primary Examiner—Dennis H. Pedder
Attorney, Agent, or Firm—Price, Heneveld, Cooper, DeWitt & Litton

[57] ABSTRACT

A vehicle visor includes a vanity mirror mounted on the side facing the interior of the vehicle when the visor is in the lowered front windshield use position. A sliding panel selectively defines a cover for the mirror and visor extender. A guide member is mounted to the visor to one side of the mirror to be concealed by the cover which includes guide tracks which slidably couple the cover to the guide member.

17 Claims, 3 Drawing Sheets

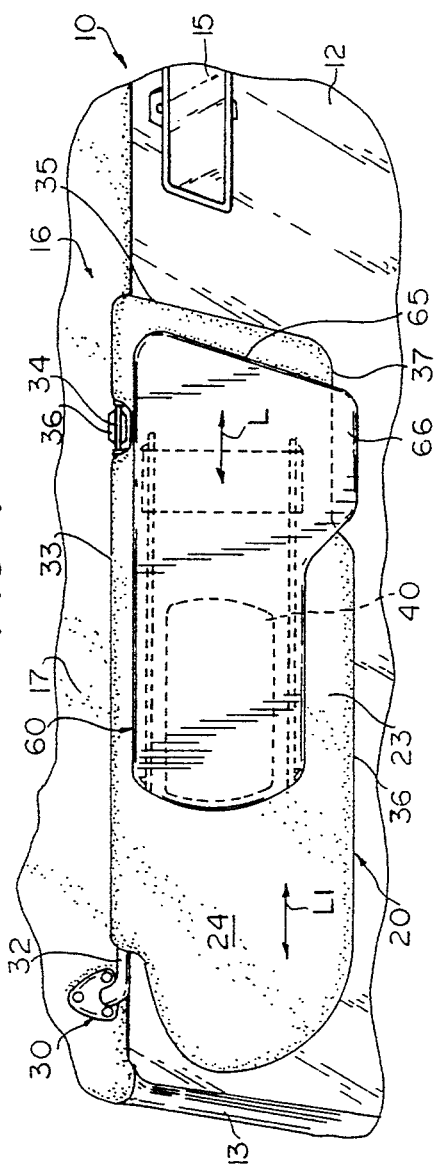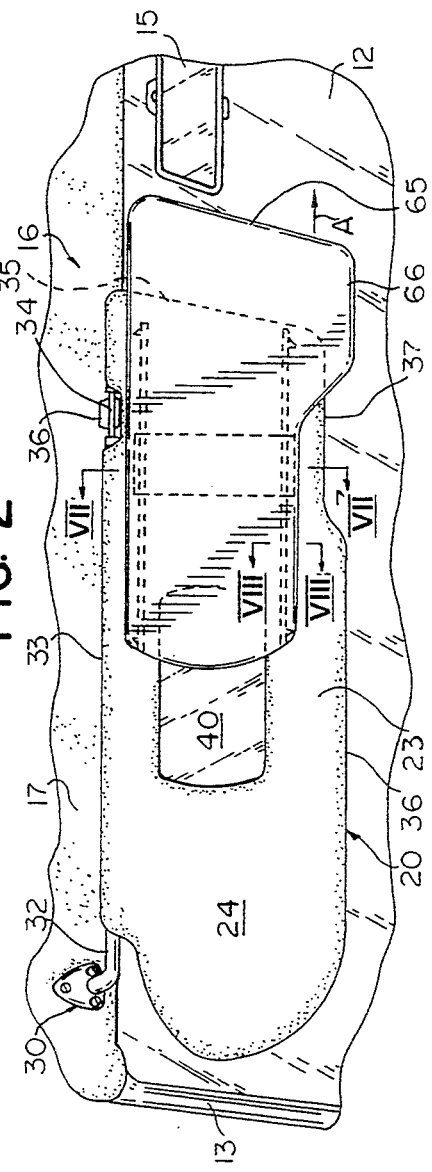

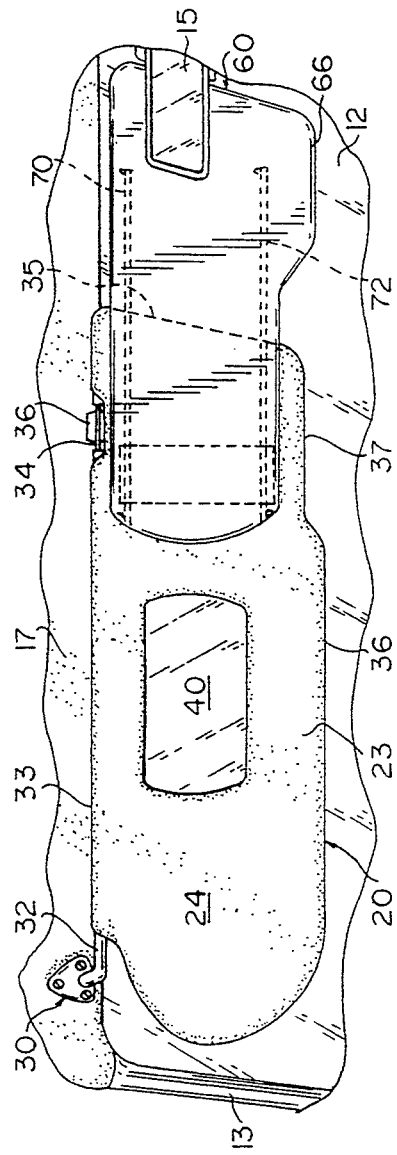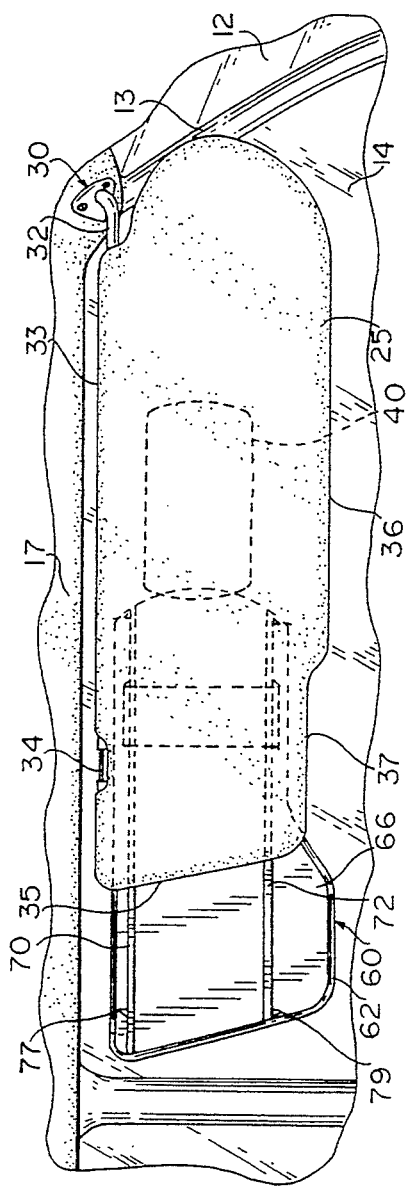

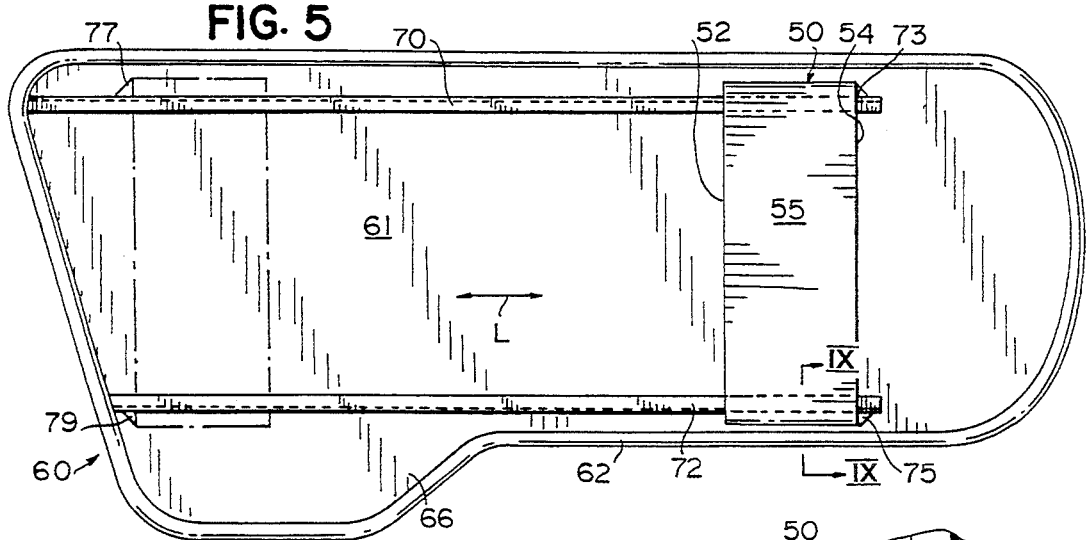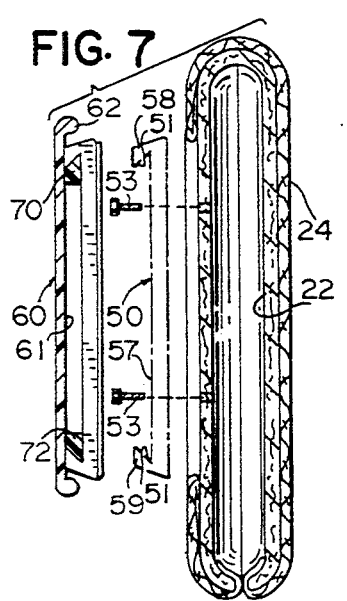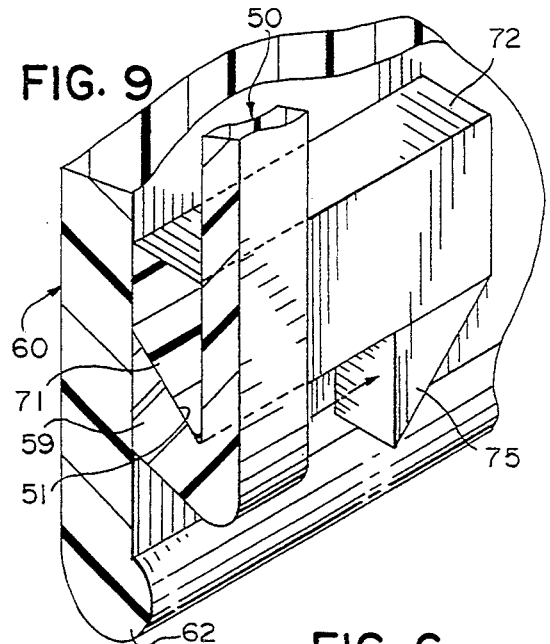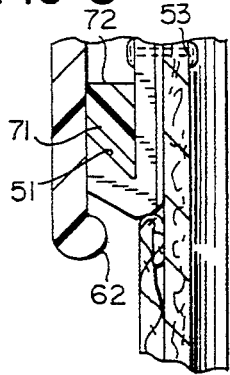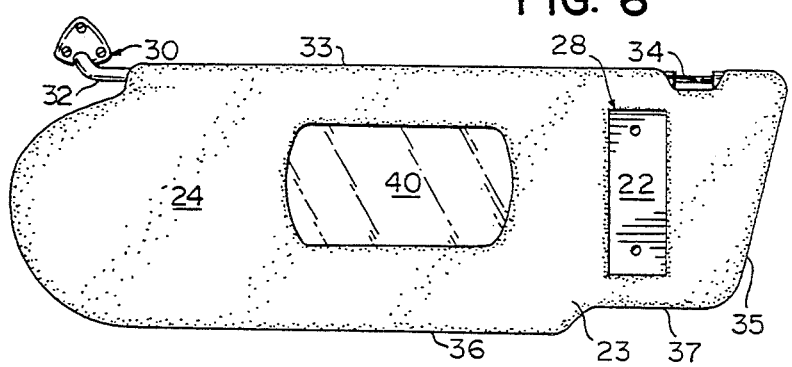

MIRROR COVER AND VISOR EXTENDER

BACKGROUND OF THE INVENTION

The present invention relates to vehicle visors and particularly to a visor having a vanity mirror mounted thereon with a sliding cover which serves the dual purpose of extending the effective sun blocking coverage of the visor.

There exists a variety of slidable visor extenders for extending the coverage of a conventional vehicle visor to provide additional selectable sun blocking protection. Some designs are sleeves which ride over an existent visor body such as disclosed in U.S. Pat. No. 2,201,197. Other visors include a sliding panel which extends from within the visor body to provide addition sun blocking protection as for example U.S. Pat. No. 2,667,222; and U.S. Pat. Des. No. 281,413. Auxiliary visor panels have also been pivotably mounted to an edge of the visor for providing additional effective sun blocking width for a visor as disclosed for example in U.S. Pat. No. Des. 335,482.

A popular vehicle accessory is a visor which includes a vanity mirror. For safety reasons, such vanity mirrors are covered by a movable cover such that the mirror, is covered when not in use. Such mirror covers are either pivotally mounted to an edge of the mirror or can be slidably mounted to selectively uncover the mirror. U.S. Pat. No. 4,791,537 discloses an illuminated vanity mirror visor having a mirror frame which receives a sliding cover which moves from a position overlying the vanity mirror to a position displaced laterally from the vanity mirror exposing the mirror for use. Such prior art sliding covers, however, are designed to provide a minimum cover size for only serving the function of covering and uncovering the mirror and frequently are mounted within the visor body itself.

SUMMARY OF THE PRESENT INVENTION

The visor of the present invention provides a visor body and means for mounting the visor body to a vehicle for movement between a raised stored position adjacent a vehicle roof and selected lowered use positions blocking sun either from the windshield or pivotally moveable to a side window sun blocking position. A panel is slidably mounted on a side of said visor body facing the interior of the vehicle when the visor is in a lowered use position adjacent the front windshield and has a longitudinal axis extending in general parallel relationship to the longitudinal axis of the visor body and having a heighth substantially equal to the heighth of the visor body. The panel is slidably mounted to the visor body by a slide mechanism which is positioned between the panel and the visor body so as not to be visible to the vehicle operator. The panel can be selectively moved to enlarge the effective width of the visor in either the front windshield position or a side window position.

In a preferred embodiment of the invention, the vehicle visor includes a vanity mirror mounted on the side facing the interior of the vehicle when the visor is in the lowered front windshield use position and the sliding panel selectively defines a cover for said mirror such that when the sliding panel is moved to a position overlying said visor body, it serves as a cover for the mirror which can be selectively uncovered for use by sliding the panel to a side of the visor. In this embodiment, the sliding panel serves the dual function of providing a mirror cover and visor extender.

In a preferred embodiment also, one end of the sliding panel has a heighth greater than the remaining end such that it cooperates with the visor body to provide a substantially uniform heighth visor when in a position aligned with the visor body with the enlarged end of the sliding panel defining a handle for control of the sliding panel for ease of use. These and other features, objects and advantages of the present invention will become apparent upon reading the following description thereof together with reference to the accompanying drawings in which:

BRIEF DESCRIPTION OF THE DRAWINGS

FIG. 1 is a fragmentary perspective view of a vehicle having a visor embodying the present invention with the visor shown in a first lowered use position;

FIG. 2 is a fragmentary perspective view of the visor shown in FIG. 1 shown in a second use position;

FIG. 3 is a fragmentary perspective view of the visor shown in FIGS. 1 and 2 shown in a third use position;

FIG. 4 is a fragmentary perspective view of the visor shown in FIGS. 1-3 shown in a fourth use position;

FIG. 5 is an enlarged rear elevational view of the sliding panel shown in FIGS. 1-4;

FIG. 6 is a reduced size front elevational view of the visor body shown with the sliding panel removed therefrom;

FIG. 7 is an exploded vertical cross-sectional view of the visor assembly taken along section lines VII—VII of FIG. 2;

FIG. 8 is an enlarged fragmentary cross-sectional view of the assembled visor taken along section lines VIII—VIII of FIG. 2; and FIG. 9 is an enlarged fragmentary perspective and cross-sectional view showing the relationship of the sliding panel and guide means taken generally along section lines IX—IX of FIG. 5.

DETAILED DESCRIPTION OF THE PREFERRED EMBODIMENT

Referring initially to FIGS. 1-4 there is shown a vehicle 10 such as an automobile having a front windshield 12, a driver's side window 14 (FIG. 4) with an A-pillar 13 extending between the windshield and side window. The windshield 12 extends under the roof 16 which includes sheet metal framework covered by a molded headliner, the surface of which includes an upholstery material 17 to provide a trim appearance to the vehicle interior. The vehicle includes a rear view mirror 15 which is typically mounted in the center area of the windshield 12 adjacent the roof 16 as seen in FIGS. 1-3.

Mounted to the vehicle 10 is a visor 20 embodying the present invention and which includes a visor body defined by a core 22 (FIG. 7) covered by a suitable upholstery material 24 conforming the visor appearance to that of a vehicle interior. The visor core 22 can be of a butterfly-type construction either made of a polymeric material as disclosed in U.S. Pat. No. 4,763,946 issued Aug. 16, 1988 and assigned to the present assignee or of a fiber-board butterfly core construction as disclosed in U.S. Pat. No. 5,007,532 issued Aug. 16, 1991 and assigned to the present assignee or other suitable core construction.

The visor includes a pivot rod assembly 30 having a pivot rod 32 extending within the visor body and secured to the visor body by means of a visor torque control such as disclosed in U.S. Pat. No. 5,004,289 the disclosure of which is incorporated herein by reference. The assembly 30 allows controlled movement of the visor between a raised stored position against the vehicle roof 16 and a lowered use position as shown in FIGS. 1–3 and pivoted to a side window position as illustrated in FIG. 4. The visor 20 also includes an auxiliary visor support rod 34 extending along the top longitudinally extending edge 33 of the visor body near right edge 35 of the visor body as shown in FIGS. 1-3. Rod 34 is removably mounted to a clip 36 mounted to the vehicle roof adjacent windshield 12. This allows the right edge 35 of the visor to be moved to the side window position as shown in FIG. 4 by vertically pivoting about pivot rod assembly 30.

Visor 20 has, in the preferred embodiment of the invention, a vanity mirror 40 mounted to the visor body in a conventional manner within a first side 23 of the visor which side faces the interior of the vehicle when the visor is in a lowered use position adjacent to front windshield as shown in FIGS. 1-3. The visor also includes an opposite side or surface 25 (FIG. 4) which faces the vehicle interior when the visor is in the side window position. The lower edge 36 of the visor body includes, adjacent edge 35, a reduced heighth section or cut-out 37 which reduces slightly the overall heighth of the visor body adjacent edge 35.

Positioned in spaced relationship near one edge of mirror 40 between the edge of the mirror and edge 35 of the visor body is guide means 50 (FIGS. 5 and 7) which is mounted in a rectangular area 28 on the visor body extending generally vertically as seen in FIG. 6. The upholstered material 24 is cut out in area 28 thus exposing the core 22 for attachment of the guide means 50. The guide means 50 comprises as best seen in FIGS. 5 and 7 a generally rectangular polymeric block having spaced vertically extending sides 52 and 54 with a rear surface 55 which is positioned adjacent visor core 22 when assembled as seen in FIG. 8 by means of fasten means 53 such as rivets or other fastening means such as a bonding adhesive for securing guide means surface 55 to the exposed outer surface of visor core 22 in area 28 shown in FIG. 6. The guide means further includes on opposite edges of surface 57 opposite surface 55, inwardly projecting tabs 58 and 59 each including a beveled notch 51 for captively holding the sliding panel 60 as described below. The guide means 50 can be attached to the visor body 22 prior to snap-fitting the sliding panel 60 thereon or, if an adhesive is employed for attaching the guide means to the visor panel, can be preassembled to the sliding panel as illustrated in FIG. 5. The guide means however is located adjacent one edge 35 of the visor body and preferably intermediate such edge and the proximate edge of the vanity mirror 40 such that it provides effective hidden slidable coupling of the sliding panel or cover 60 to the visor body.

The panel 60 is best seen in FIGS. 1-5 and has a longitudinal axis L (FIG. 5) which is aligned with the longitudinally extending axis of the visor 20 as seen in FIG. 1. Sliding panel 60 is preferably made of a polymeric material such as polycarbonate or other suitable polymeric material and includes a rounded edge 62 extending around the periphery thereof to provide a finished appearance to the panel. The right edge 65 of panel 60 includes a downwardly extending tab 66 providing a vertical heighth for the panel which, when installed to the visor, substantially fills the slot 37 providing a substantially uniform heighth to the visor body as best seen in FIG. 1 when the sliding panel 60 is in its one end position completely overlying the visor body.

The panel or cover 60 includes a pair of parallel spaced guide tracks 70 and 72 which can be integrally formed on the rear surface 61 of the sliding panel 60 and which each include a beveled triangular-shaped tip 71 extending outwardly in opposite directions from one another for cooperatively captively holding the panel to the mating notches 51 of guide means 50 its best seen in FIGS. 8 and 9.

The sliding cover 60 and the polymeric guide means 50 are both sufficiently resilient to allow the sliding panel to be snap-fitted to the guide means with tabs 58 and 59 and guide tracks 70 and 72 deflecting sufficiently to allow snap-fitting installation of the sliding panel to the guide means. The tracks 70 and 72 each include end stops 73 and 75, respectively, defining stops for a fully extended position as shown in FIG. 3 and second end stops 77 and 79 defining stops for the fully retracted position illustrated in FIG. 1. The stops engage the edge of guide 50 as best seen in FIG. 5 limiting the motion of the sliding panel to the extreme end position shown in FIGS. 1 and 3 but allowing any desired intermediate adjusted position as illustrated, for example, in FIG. 2. The vertical heighth of the end of the sliding panel 60 which overlies the mirror 40 is substantially less than the heighth of end 65 which is substantially equal to the heighth of the visor body itself. This provides an attractive sliding cover which effectively covers the mirror 40 as seen in FIG. 1 and yet provides an equal heighth visor extender as seen in FIGS. 2–4 serving to improve the visor sun blocking performance when in an extended position. The tab 66 in cooperation with the cut-away 37 in the visor body provides a convenient handle for gripping the lower corner of the sliding panel 60 for movement of the panel to selected use positions. In operation, when the visor is in a lowered first use position as shown in FIG. 1, the vehicle operator can adjust the effective width of the visor by grasping tab 66 and sliding the sliding panel 60 to the right as indicated by Arrow A in FIG. 2 to any desired selected use position until an end- most position is reached as shown in FIG. 3. In this position, sliding panel 60 extends behind the rear view mirror as seen in FIG. 3. In this position also, the vanity mirror 40 is fully exposed for use although it is also fully exposed prior to the extreme end position shown in FIG. 3.

With the visor sliding panel in the position shown in FIG. 1, the visor 20 can be also moved to a side window position as illustrated in FIG. 4 and again the sliding panel 60 can be selectively moved to any one of a plurality of desired adjusted positions for increasing the effective sun blocking protection of the visor when in a side window position.

Thus, the visor system of the present invention provides a visor body and sliding cover which cooperate to provide an attractive sliding cover mounted to one side of the visor body using coupling means which are hidden behind the sliding panel and which can provide increased effective sun blocking protection for the visor. In a preferred embodiment of the invention, the sliding panel also serves as a sliding cover for a vanity mirror mounted to one side of the visor body such that the sliding panel not only provides improved visor sun blocking performance, but also provides a safety cover for a vanity mirror. It will become apparent to those skilled in the art that various modifications to the preferred embodiment of the invention as disclosed herein can be made without departing from the spirit or scope of the invention as defined by the appended claims.

The embodiments of the invention in which an exclusive property or privilege is claimed are defined as follows.

1. A vehicle visor comprising:
   a visor body having a mirror mounted on one side thereof for use when the visor is moved to a lowered use position,
   a guide member mounted to said one side of said visor body in spaced relationship to said mirror; and
   a cover slidably coupled to said guide member for sliding movement between a first position substantially covering said mirror when said mirror is not in use and slidable in a direction along the longitudinal axis of said visor body to at least a second position remote from said first position whereby said mirror is uncovered and said cover extends beyond an edge of said visor body to extend the effective width of said visor body for providing additional sun blocking protection, wherein said guide means on said visor body is hidden behind said sliding panel for all positions of said panel.

2. The visor as defined in claim 1 wherein said guide member comprises a pair of spaced projections extending in generally parallel relationship to each other and to the longitudinal axis of said visor body each defining one of a slot and tip.

3. The visor as defined in claim 2 wherein said cover includes a pair of spaced projections extending in generally parallel relationship to each other each defining the other of said slot and tip and co-operating with said guide member for slidably attaching said cover to said visor body.

4. The visor as defined in claim 3 wherein said cover includes first and second ends and wherein said second end has a height greater than the height of said first end.

5. The visor as defined in claim 4 wherein said second end of said cover has an edge which projects beyond the edge of said visor body to define a handle for sliding said cover.

6. The visor as defined in claim 5 wherein said visor body includes a notch aligned with said handle of said sliding cover when said cover is in said first position.

7. The visor as defined in claim 6 and further including stop means extending between said cover and said guide member for limiting the travel limits of said cover.

8. An extendable sun visor comprising:
   a visor body having a pivot mounting bracket attached thereto for mounting said visor body to a vehicle, said visor body having a width extending in a direction along a longitudinal axis which is greater than the heighth of said visor body which is orthogonal to said longitudinal axis; and
   a sliding panel having a longitudinal axis along the width of said panel which is greater than the heighth of said panel, said sliding panel having slide means mounted on one side thereof and slidably engaging guide means mounted on a facing surface of said visor body such that said sliding panel can be moved along the longitudinal axis of said visor body between a first position substantially overlying said visor body to extended positions whereby said sliding panel extends beyond an edge of said visor body to extend the effective sun blocking width of said visor body, wherein said guide means on said visor body is hidden behind said sliding panel for all positions of said panel.

9. The visor as defined in claim 8 wherein said guide means comprises a pair of spaced projections defining inclined surfaces.

10. The visor as defined in claim 9 wherein said slide means comprises a pair of parallel tracks having inclined surfaces captively held by said inclined surfaces said guide means.

11. The visor as defined in claim 10 wherein said sliding panel includes a handle extending beyond an edge of said visor body for moving said sliding panel.

12. The visor as defined in claim 11 and further including stop means extending between said guide means and said slide means for limiting the motion of said sliding panel.

13. The visor its defined in claim 12 and further including a mirror mounted in said visor body behind said sliding panel when said panel is in said first position.

14. The visor as defined in claim 13 wherein said guide means is mounted in spaced relationship to one side of said mirror.

15. A vehicle visor comprising:
   a visor body having a longitudinal axis and a pivot assembly mounting said visor body to a vehicle for movement between selected use positions, said visor body having a mirror mounted on one side thereof for use when the visor is lowered to a first use position,
   a guide member including vertically spaced inclined surfaces extending along the longitudinal axis of said visor body, said guide member mounted to said one side of said visor body in spaced relationship to an edge of said mirror; and
   a cover including guide tracks having inclined surfaces which co-operate with said inclined surfaces of said guide member for slidably covering said cover to said visor body for movement between a first position substantially covering said mirror when said mirror is not in use and slidable in a direction along the longitudinal axis of said visor body to at least a second position remote from said first position whereby said mirror is uncovered and in which said cover extends beyond an edge of said visor body to extend the effective width of said visor body for providing additional sun blocking protection, and further including stop means extending between said guide means and said guide tracks to limit the motion of said sliding cover, and wherein said guide means is positioned to be concealed behind said cover for all positions of said cover.

16. The visor as defined in claim 15 wherein said cover is made of a resilient polymeric material and said guide tracks snap fit over said inclined surfaces of said guide means.

17. The visor as defined in claim 16 wherein said guide means is made of a resilient polymeric material for snap receiving said guide tracks.

* * * * *

UNITED STATES PATENT AND TRADEMARK OFFICE
CERTIFICATE OF CORRECTION

PATENT NO. : 5,431,473

DATED : July 11, 1995

INVENTOR(S) : David L. Hiemstra

It is certified that error appears in the above-indentified patent and that said Letters Patent is hereby corrected as shown below:

Col. 1, line 16;

"addition" should be --additional--.

Col. 1, line 52;

"heighth" should be --height--.(both occurrences)

Col. 2, line 4;

"heighth" should be --height--.

Col. 2, line 6;

"heighth" should be --height--.

Col. 2, line 63

"fiber- board" should be --fiber-board--.

Col. 3, line 26;

"heighth" should be --height--.

UNITED STATES PATENT AND TRADEMARK OFFICE
CERTIFICATE OF CORRECTION

PATENT NO. : 5,431,473

DATED : July 11, 1995

INVENTOR(S) : David L. Hiemstra

It is certified that error appears in the above-indentified patent and that said Letters Patent is hereby corrected as shown below:

Col. 3, line 67;

"heighth" should be --height--.

Col. 4, line 1;

"heighth" should be --height--.

Col. 4, line 26;

"heighth" should be --height--.

Col. 4, line 28

"heighth" should be --height--.

Col. 4, line 29;

"heighth" should be --height--.

Col. 4, line 31;

"heighth" should be --height--.

Col. 4, line 43;

"end- most" should be --end-most--.

UNITED STATES PATENT AND TRADEMARK OFFICE
CERTIFICATE OF CORRECTION

PATENT NO.    : 5,431,473
DATED         : July 11, 1995
INVENTOR(S)   : David L. Hiemstra It is certified that error appears in the above-indentified patent and that said Letters Patent is hereby corrected as shown below:

Col. 3, line 27;

"heighth" should be --height--.

Col. 3, line 40;

"fasten" should be --fastening--.

Col. 6, line 21, claim 13;

"its" should be --as--.

Signed and Sealed this

Seventh Day of November, 1995

Attest:

BRUCE LEHMAN

*Attesting Officer*     *Commissioner of Patents and Trademarks*